INVENTOR
Jean M. Bourquet

Nov. 21, 1961　　J. M. BOURGUET　　3,009,472
CATALYST VALVE

Filed March 10, 1959　　4 Sheets-Sheet 2

INVENTOR
Jean M. Bourquet

BY Charles A. Huggett

ATTORNEY

Nov. 21, 1961  J. M. BOURGUET  3,009,472
CATALYST VALVE
Filed March 10, 1959  4 Sheets-Sheet 3

INVENTOR
Jean M. Bourquet

BY  Charles A. Huggett
ATTORNEY

Nov. 21, 1961   J. M. BOURGUET   3,009,472
CATALYST VALVE

Filed March 10, 1959   4 Sheets-Sheet 4

INVENTOR
Jean M. Bourquet
BY Charles A. Huggett
ATTORNEY

United States Patent Office 3,009,472
Patented Nov. 21, 1961

3,009,472
CATALYST VALVE
Jean M. Bourguet, Woodbury, N.J., assignor to Socony Mobil Oil Company, Inc., a corporation of New York
Filed Mar. 10, 1959, Ser. No. 798,520
3 Claims. (Cl. 137—240)

This invention relates to a valve for controlling the flow of a granular or powdered solid material. The invention finds particular application in various moving and fixed bed chemical processes in which the particulate solid material must be transferred from time to time from one vessel to another.

In the petroleum industry various types of moving and fixed bed processes have been developed in which solid particles are used as catalyst or heat transfer material. It has always been difficult in these processes to use mechanical valves as flow control means since the particles are highly abrasive and cause excessive wear of the valves. Furthermore, the particles tend to migrate in recesses in the moving valves and tend to jam the valves making them inoperable. Typical processes involve catalytic reforming, catalytic cracking, desulfurization, heat exchange reactions involving solid materials as heat transfer media, etc.

Plug type mechanical valves have been used in these processes to control catalyst or particle solids flow but varous difficulties have been encountered. The plug valve comprises generally a cylindrical valve body mounted for rotation about its axis in a cylindrical valve housing. The housing is mounted in the transfer pipe with its axis in horizontal alignment, the inlet to the housing being located at the top of the housing and the outlet of the housing being located at the bottom thereof. The valve plug possesses a passageway of circular cross-section which is brought into alignment with the ends of the transfer pipe by rotation of the valve plug whereby flow of solids through the valve occurs. Rotation of the valve to place the passageway in horizontal alignment causes the flow of solids to cease. The plug valves are designed with full bearing contact over the regions of the cylindrical valve body exclusive of the area of the passageway. This provides a substantial bearing contact giving excellent alignment but unfortunately provides excessive friction when used to control catalyst or solid particle flow. The plug valve is designed with means for injecting a lubricant to the bearing surface to effectively reduce the frictional forces and permit rotation. This arrangement generally comprises oil channels and grooves in the bearing surface to carry the lubricant through the valve body to the bearing surfaces. When transferring solid particles the lubricant combines with the solid particles and the lubricant acts as a binder causing the particles to lump together in a gummy mass. This causes additional difficulty in the operation of the valve and hence these valves have not been found satisfactory for this service.

It is an object of this invention to provide a valve for use in controlling the flow of a stream of solid particles.

It is a further object to provide a solids flow control valve which is easy to operate and free from operational difficulties.

These and other objects will become obvious by reference to the attached figures and the following detailed description of the invention.

The invention in one form comprises a cylindrical housing mounted horizontally, with a cylindrical valve plug arranged therein for rotation in only one direction. An inlet is located at the top of the housing and an outlet is located at the bottom thereof, the valve plug possessing a passageway of circular cross-section adapted to be brought into alignment with the inlet and outlet of the housing by rotation of the valve plug. A narrow raised portion is located about each end of the passageway adapted to make bearing contact with the valve housing. A narrow raised portion is located about each end of the valve plug adapted to make bearing contact with the valve housing. Between the raised end portions and the raised portions about the passageway are located on each side of the valve plug recessed portions providing a substantial area of the valve plug in substantial separation from the valve housing. Within each raised end portion is a groove blocked adjacent the ends of the passageway and connected to gas supply so that a continuous supply of gas under pressure is brought to the bearing areas and passed thereover to serve as a lubricant and prevent transfer of solid particles into the bearing recesses. The recessed portions are also provided with gas under pressure to provide gas flow over the bearing surfaces surrounding the ends of the passageway. An axle projects from the valve housing for rotation of the valve plug and blocking means is provided adjacent thereto to prevent reverse rotation of the valve.

Figure 1:
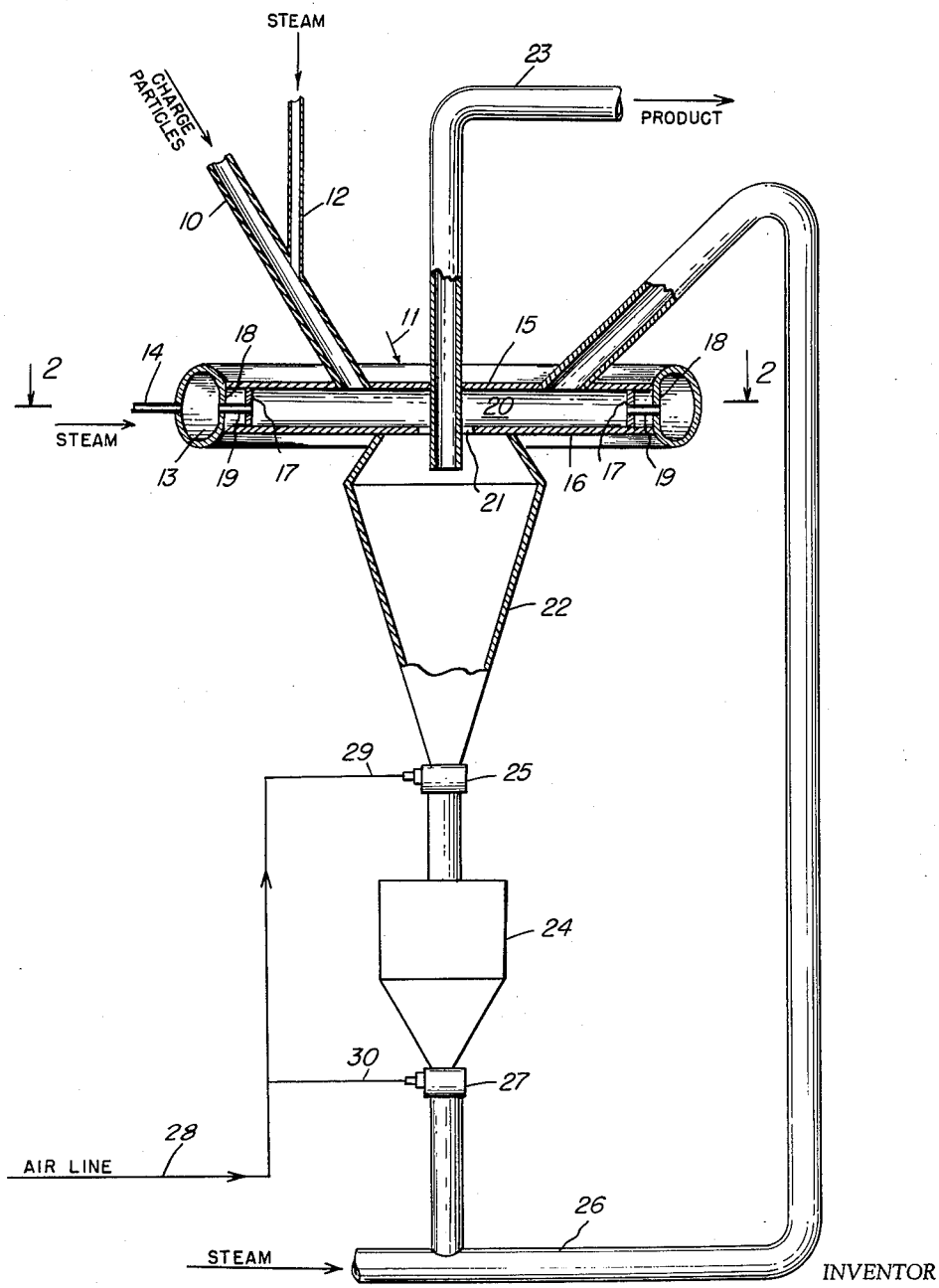
FIGURE 1 shows a process for grinding catalyst particles continuously to fine particle size.
Figure 2:
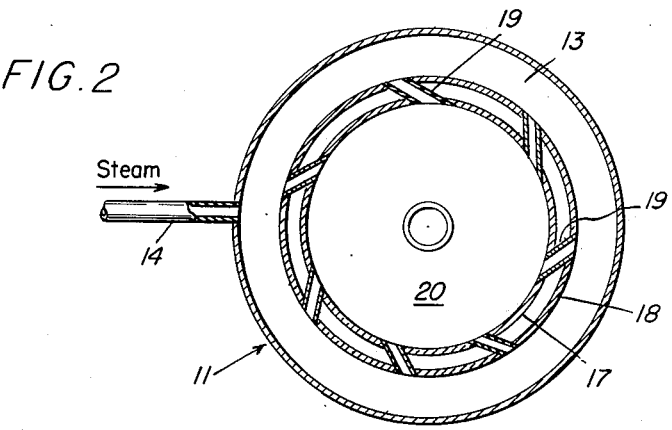
FIGURE 2 shows a sectional view of FIGURE 1 as seen on plane 2—2 of that figure.

The invention will be disclosed as applied to a continuous process for the production of fine particles for incorporation in catalyst beads to produce an unusually hard, durable catalyst having excellent characteristics for use in the TCC process for manufacturing gasoline from heavy oils. This process was selected for illustration of the invention since the valve was first successfully applied to this process although the use of the valve is not limited to this particular process. It was found in this process necessary to provide silica-alumina or alumina particles of precisely 3 to 4 microns and the continuous grinding procedure depicted in FIGURES 1 and 2 was utilized. A charge of 1800 pounds per hour of size 5–100 mesh silica-alumina or alumina was charged through conduit 10 into the grinder 11. Steam was introduced through the conduit 12 to aid in the introduction of the catalyst charge.

The grinder 11 comprised a circular manifold 13 into which steam under pressure was passed through the conduit 14. A circular flat top wall 15 and circular flat bottom wall 16 are located within the exterior manifold 13. Inner and outer circular end walls 17 and 18 provide support for nozzles 19 through which steam is transferred from the manifold 13 to the grinding chamber 20. It can be seen on FIGURE 2 that the nozzles 19 are arranged to cause rotation of the steam in the grinding chamber and this causes an erosion of the particles, producing the desired fine particles. About 6000 pounds per hour of steam was found necessary to produce a yield of about 1800 pounds per hour particles in the desired size range. The particles spilled from the grinder through the aperture 21 into the separator 22. The 3–4 micron particles escaped through the conduit 23 and were collected as product. The heavier particles fell to the bottom of the separator 22 and were from time to time transferred to the hopper 24. The product was blended with the catalyst beads during the forming process to produce an improved catalyst bead having improved attrition resistance and other properties useful for catalyst in the moving bed or TCC process.

The valves of this invention were used to feed the particles into the hopper 24, see detail 25, and to feed the particles from the hopper 24 into the recycle line 26, see detail 27. Steam was introduced into the recycle line to return oversized particles through conduit 26 back to the grinder 20. The recycle ratio was about 1/1. The particles in the hopper 24 were found to be of a size range of about 5–15 microns under these operating conditions.

Air under pressure was introduced continuously into the valves 25 and 27 through the conduits 28, 29 and 30. The air was used to provide lubrication to the valves and purge the bearing surfaces of interfering particles. The valves operated successfully in this process providing trouble-free surface with easy operation.

Figure 3:
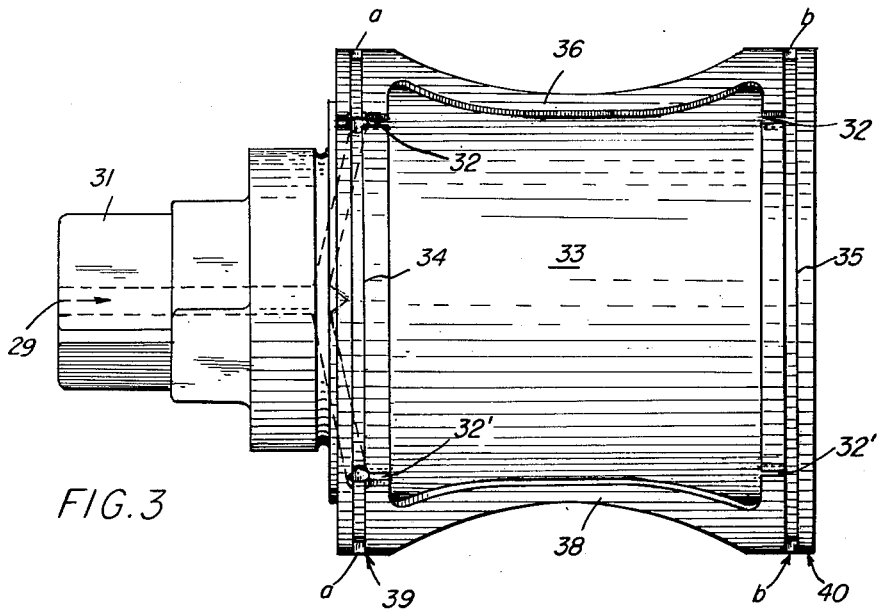
FIGURE 3 shows a view of the valve plug in disassembled position.

FIGURE 3 shows in detail the valve plug with the entrance and exit of the transfer passageway located at the top and bottom of this view. The square projection 31 extends from the housing and provides a means for rotating the valve plug. The air conduit connected to the valve housing communicates with the groove 32, supplying air to the recessed portion 33 and to the end grooves 34, 35. A narrow raised portion 36 is located about one end of the passageway 37 and a second narrow raised portion 38 is located about the other end of the passageway 37. These raised portions are arranged to make bearing contact with the housing and particularly with bearing surfaces about the inlet and outlet of the housing. The air from the recessed portion of the valve body flows over these narrow raised portions serving as a lubricant and also as a means of keeping the bearing surfaces free of particles which would be trapped, crushed and serve to jam the valve. Similarly, narrow raised portions are provided at each end of the valve plug to provide bearing contact with the valve housing, thereby serving to keep the valve in proper alignment, see details 39, 40. The grooves 34 and 35 are located within these narrow raised end portions 39, 40 and the raised end portions are in contact with the narrow raised portions 36, 38 adjacent the ends of the passageway 37. They form the boundaries of the recessed portions 33, 41. The raised portions of the valve plug give only restricted contact with the valve housing providing minimum frictional drag. Furthermore, the use of gas under pressure over these minimal contact surfaces provides lubricant value permitting the valves to be operated dry. Dams $a$ and $b$ are provided in grooves 39 and 40, being located adjacent the ends of passageway 37. When the valve plug is located in the closed position, these dams $a$ and $b$ serve to prevent the escape of powdered solids through the grooves, in the event the gas pressure should fall to too low a value. These blocking members can be located in the grooves after the grooves have been machined or the grooves can be cut so as to leave the blocking means indicated opposite each side of each end of the passageway 37 through the plug.

Figure 4:
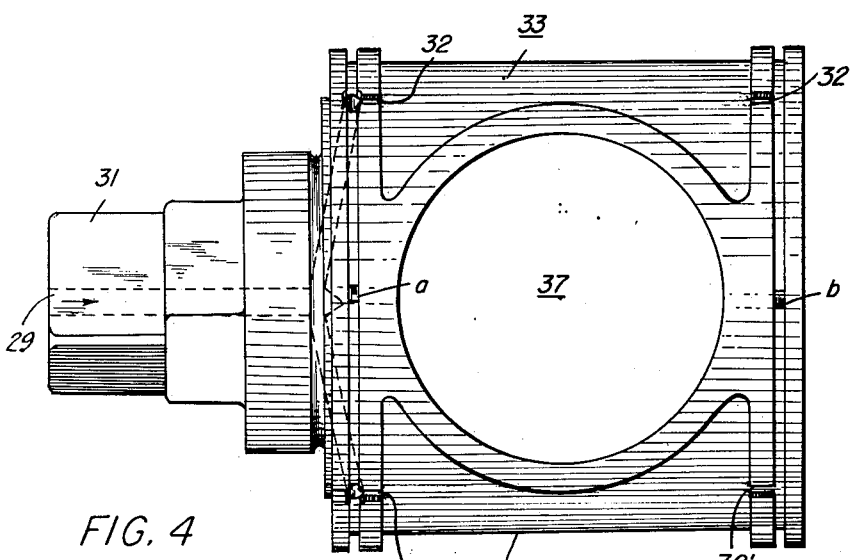
FIGURE 4 shows a view of the valve plug, rotated 90 degrees from the view of FIGURE 3.

FIGURE 4 is similar to FIGURE 3 but shows the valve rotated 90 degrees. The passageway 37 is, therefore, seen in cross-section.

Figure 5:
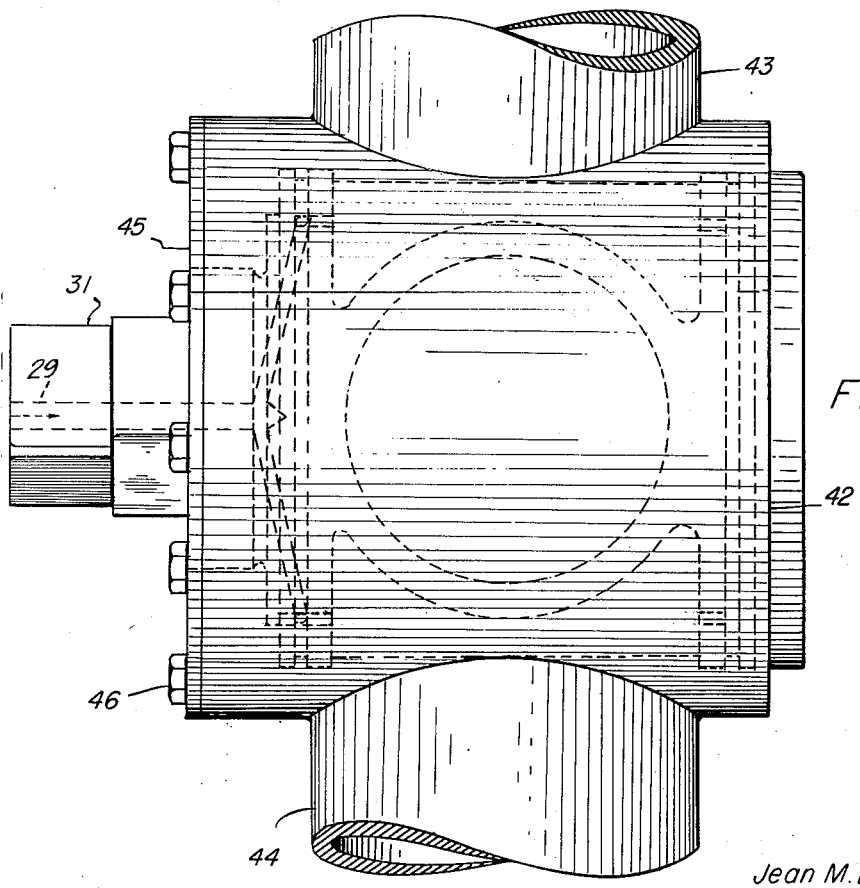
FIGURE 5 shows the valve assembled in the housing, a portion of the feed and discharge pipes being included.

FIGURE 5 shows a view of the valve housing 42 with a portion of the inlet pipe 43 at the top and a portion of the outlet pipe 44 at the bottom. The extension of the valve plug is shown on this figure with the square projection 31 adapted for rotation. A drive means may be attached to this projection and this may be a motor, either manually or automatically controlled. The plate 45 is bolted to the housing 42 by the bolts 46. The air line 29 leads a continuous stream of gas, such as air, under pressure through passageways in the valve plug thereby providing air lubrication to the bearing surfaces and tending to maintain these surfaces free of particles.

Figure 6:
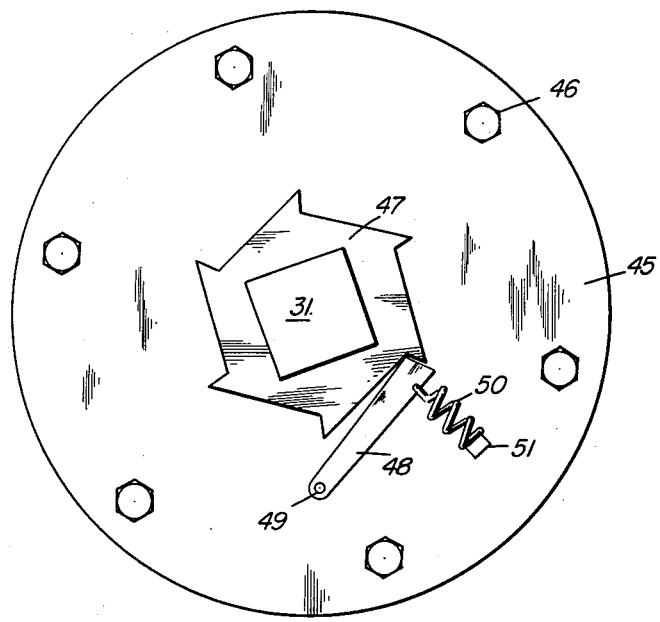
FIGURE 6 shows an end view of the housing, including a mechanical arrangement for preventing reverse rotation.

FIGURE 6 shows an end view of the valve. The plate 45 is seen more clearly on this view with the bolts 46 shown fastening the plate 45 to the housing 42. A sprocket plate 47 is shown attached to the valve plug extension so as to rotate with the valve plug. A key 48 is pivoted on the pin 49 and held against the teeth of the sprocket plate 47 by the spring 50. The spring 50 is retained under compression by the keeper 51 which connects to the plate 45. The valve plug can rotate counterclockwise as seen on FIGURE 6 but cannot rotate in a clockwise direction. It has been found that in transferring catalyst through valves of this type substantially better performance is obtained when the valve is rotated in only one direction. Former valves were designed to reverse direction and this tended to pack catalyst particles into the crevices of the valve and particularly between the bearing surfaces.

The combination of features found in this valve adapt this valve particularly for use in transferring highly abrasive granular or powdered catalyst particles. The narrow bearing surfaces on the ends of the cylindrical valve body and around the passageway through the valve body provide good alignment with minimum frictional contact and yet serve to block the flow of particles into the inner recesses of the valve. The limited bearing contacts permit easy operation of the valve without a liquid or semi-liquid lubricant. The application of the gas over these limited bearing surfaces provides lubrication and aids in confining the granular particles out of the enclosed recesses of the valve. The feature of continuous rotation in one direction avoids the tendency of driving solid particles between the bearing surfaces and hence permits longer valve life free from operational difficulties.

The valve finds many uses in the transfer of solids and powders, particularly highly abrasive powders and catalyst particles now used in many chemical processes. The invention is, of course, not limited to the particular process described hereinabove, this being one particular process in which the valve has been successfully applied and recited here only for illustration. The only limitations intended are those found in the following claims.

I claim:

1. A valve for controlling the flow of a gravitating granular stream of solid particles comprising in combination: a cylindrical valve housing mounted with its axis horizontally disposed, an inlet at the top of said housing, an outlet at the bottom of said housing, a cylindrical valve plug located within said housing and adapted for rotation therein, a passageway of circular cross-section extending through said valve plug, adapted to be brought into alignment with the inlet and outlet of said valve housing for the transfer of granular particles, narrow raised portions on the valve plug surrounding the ends of said passageway and adapted to make bearing contact with said valve housing, narrow raised portions surrounding the ends of said valve plug, adapted to make bearing contact with the valve housing, continuous grooves located within the narrow raised end portions, recessed chambers in the surface of said valve plug defined by said narrow raised end portions and said narrow portions surrounding said passageway, means for feeding a continuous supply of dry gas under pressure to said grooves and to said recessed chambers whereby said narrow raised bearing portions are continuously subject to a flow of dry gas thereover, and means adapted to permit rotation of said valve plug in only one direction.

2. Claim 1 further characterized in that blocking means are provided in said grooves adjacent the ends of said passageway adapted to block solids transfer through said grooves.

3. A valve for controlling the flow of a gravitating stream of solid particles comprising in combination: a cylindrical valve housing mounted with its axis horizontally disposed, an inlet at the top of said housing, an outlet at the bottom of said housing, a cylindrical valve plug located within said housing and adapted for rotation therein, a passageway of circular cross-section extending through said valve plug, adapted to be brought into alignment with the inlet and outlet of said valve housing for the transfer of solid particles, a narrow raised portion surrounding the ends of said passageway and adapted to make bearing contact with said valve housing, a narrow raised portion surrounding the ends of said valve plug, adapted to make bearing contact with the valve housing, means defining recessed chambers on each side of said valve plug and defined by the narrow raised portion surrounding the ends of said passageway and the narrow raised portions surrounding the ends of said valve plug, means for supplying a dry gas under pressure to the narrow raised portions surrounding the ends of said passageway and the narrow raised portions surrounding the ends of said valve plug, to provide a flow of dry gas over the bearing surfaces and inwardly toward the ends of the passageway in said valve plug, to serve as a dry lubricant for the bearing surfaces and to prevent the migration of solid particles between the bearing surfaces and into the inner recesses of the valve, and means for permitting rotation of said valve plug in only one direction of rotation.

References Cited in the file of this patent

UNITED STATES PATENTS

| | | |
|---|---|---|
| 967,460 | Straub | Aug. 16, 1910 |
| 1,487,207 | Clausing | Mar. 18, 1924 |
| 1,849,395 | Andrews | Mar. 15, 1932 |
| 2,045,113 | Ward | June 23, 1936 |
| 2,073,541 | Trott | Mar. 9, 1937 |
| 2,315,058 | Holt | Mar. 30, 1943 |
| 2,485,316 | Robbins | Oct. 18, 1949 |
| 2,631,759 | Hoopes | Mar. 17, 1953 |
| 2,651,320 | Hirsch | Sept. 8, 1953 |
| 2,766,911 | Greaves | Oct. 16, 1956 |